No. 856,048. PATENTED JUNE 4, 1907.
A. GAILLARD.
APPARATUS FOR CONCENTRATING SULFURIC ACID.
APPLICATION FILED JAN. 24, 1906.
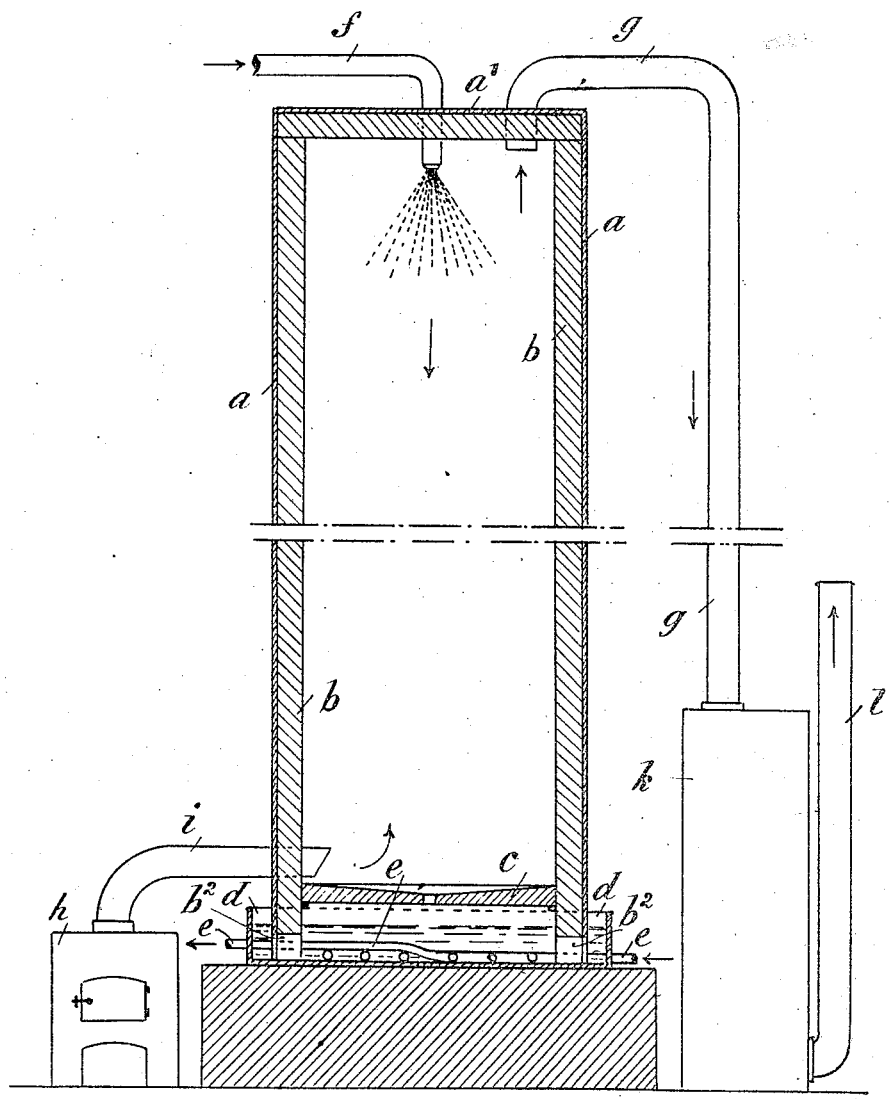
Witnesses
Inventor
Antonio Gaillard
by Wilkinson & Fisher
his Attorneys

UNITED STATES PATENT OFFICE.

ANTONIO GAILLARD, OF BARCELONA, SPAIN.

APPARATUS FOR CONCENTRATING SULFURIC ACID.

No. 856,048.     Specification of Letters Patent.     Patented June 4, 1907.

Application filed January 24, 1906. Serial No. 297,695.

*To all whom it may concern:*

Be it known that I, ANTONIO GAILLARD, a subject of the King of Spain, residing at Barcelona, Spain, Plaza de Palacio, 6, have invented certain new and useful Improvements in Apparatus for the Concentration of Sulfuric Acid; and I do hereby declare the following to be a full, clear, and exact description of the invention, such as will enable others skilled in the art to which it appertains to make and use the same.

My invention relates to an apparatus for the concentration of the sulfuric acid, which consists of a vertical chamber, the lower part whereof communicates with a furnace in which by the combustion of coke a stream of hot air is produced. The upper part of the chamber communicates with a pipe which conveys the sulfuric acid to be concentrated and throws it into said chamber in a fine spray. The bottom of said chamber is perforated and is placed upon a receptacle into which the concentrated sulfuric acid flows and in which there is a serpentine pipe of cold water to cool the sulfuric acid. The upper part of the chamber communicates with a lead receptacle filled with coke for the condensation of the sulfuric acid which may be carried along by the air stream. Thus the pure air flows out from the low part of the concentration chamber toward a chimney which regulates the air stream through the apparatus.

The object of the apparatus is to fill the chamber with sulfuric acid in the form of spray in order to bring it into contact with the hot air coming from below, and thus obtain a quick evaporation or concentration of the sulfuric acid which drops in the receptacle at the base of the chamber where it is cooled. To obtain this result I employ the apparatus represented in the annexed drawing, in which the concentration chamber is shown in transverse section, whereas the furnace and the recovery chamber are shown in elevation.

The chamber consists of a cylindrical casing —$a$— of lead, closed by the upper part —$a'$— and coated inside with Volvic stone —$b$— or other coating which may not be injured by the action of heat or the acid. The top part —$a'$— of the chamber is crossed by the pipe —$f$— conveying the sulfuric acid to be concentrated, and by the tube —$g$— conveying the gases out of the chamber —$b$—. The pipe —$f$— terminates in a nozzle so that the sulfuric acid enters the chamber —$b$— finely sprayed and fully fills it. The bottom —$c$— which is placed a certain distance above the edge, is made of refractory stone and is perforated so as to permit the concentrated sulfuric acid to flow out through the perforations of the bottom —$c$—.

The concentration chamber —$b$— is placed on a lead receptacle —$d$— containing a serpentine —$e$— into which a cold water stream is caused to circulate, in order to cool the sulfuric acid flowing to the said receptacle —$d$—. The acid flows away through perforations —$b^2$— in the lower end of the chamber —$b$—.

Above the bottom —$c$—, there is a pipe —$i$— conveying the hot air coming from the furnace —$h$— which may be of any kind. The tube —$g$— through which the hot air flows out of the chamber —$b$— terminates in a lead receptacle —$k$— filled with coke and said receptacle bears a tube —$l$— arising from the lower part and conveying the gases to the chimney.

As the air is caused to traverse the coke contained into the chamber —$k$— it gets rid of all the sulfuric acid which may be carried by the air current.

The operation is as follows:—The sulfuric acid is delivered under pressure through the pipe $f$ and finely sprayed by the nozzle at the end thereof, filling the chamber $b$ of the tower, the main body of which is entirely unobstructed, with fine mist of sulfuric acid. At the same time the pipe $i$ delivers hot air into the interior of the chamber $b$, which air comes in contact with the sulfuric acid mist, quickly concentrating it. The air then flows out through the tube $g$ toward the chimney and any acid carried along by the air current is condensed in the chamber $k$. The concentrated acid falls upon the bottom $c$ and through the perforations $b^2$ thereof it passes into the receptacle $d$ in which it is thoroughly cooled by the action of the pipe $e$.

Having thus described my invention, what I claim as new and desire to secure by Letters Patent is:—

1. In an apparatus for the concentration of sulfuric acid, the combination of a tower provided with a perforated bottom, the main portion of the interior of the tower being entirely unobstructed, means for filling said tower from the top with sulfuric acid mist, means for delivering a current of hot gas into said tower near its lower end and above the perforated bottom thereof, and means for cooling the acid in the lower part of said tower after it has passed through said bottom, substantially as described.

2. In an apparatus for the concentration of sulfuric acid, the combination of a vertically constructed tower, the main portion of the body of which is entirely unobstructed, a pipe entering said tower at the top and terminating in a nozzle, a perforated bottom for said tower located near the lower end thereof, a hot air pipe entering said tower just above said perforated bottom, and a receptacle in which said tower is supported, said tower being provided with perforations underneath said bottom, whereby the acid is delivered from said tower into said receptacle, substantially as described.

3. In an apparatus for the concentration of sulfuric acid, the combination of a tower, a pipe terminating in a nozzle entering the upper end of said tower, a perforated bottom for said tower located near the lower end thereof, a hot air pipe entering said tower just above said perforated bottom, a receptacle in which said tower is supported, said tower being provided with perforations at its base, and a cooling pipe located in said receptacle, substantially as described.

In testimony whereof, I affix my signature, in presence of two witnesses.

ANTONIO GAILLARD.

Witnesses:
BENJ. H. RIDGELY,
STANLEY L. HARRIS.